United States Patent
Hirao et al.

(10) Patent No.: US 7,417,002 B2
(45) Date of Patent: Aug. 26, 2008

(54) BORON CARBIDE BASED SINTERED COMPACT AND METHOD FOR PREPARATION THEREOF

(75) Inventors: Kiyoshi Hirao, Nagoya (JP); Shuji Sakaguchi, Nagoya (JP); Yukihiko Yamauchi, Nagoya (JP); Shuzo Kanzaki, Nagoya (JP); Suzuya Yamada, Nagoya (JP)

(73) Assignees: National Institute of Advanced Industrial Science and Technology, Tokyo (JP); Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/927,024

(22) Filed: Oct. 29, 2007

(65) Prior Publication Data

US 2008/0063583 A1  Mar. 13, 2008

Related U.S. Application Data

(60) Division of application No. 11/618,020, filed on Dec. 29, 2006, which is a continuation of application No. 11/477,433, filed on Jun. 30, 2006, now abandoned, which is a continuation of application No. 10/493,222, filed as application No. PCT/JP02/11577 on Nov. 6, 2002, now abandoned.

(30) Foreign Application Priority Data

Nov. 6, 2001  (JP) .............................. 2001-341205
May 7, 2002  (JP) .............................. 2002-131272

(51) Int. Cl.
C04B 35/563 (2006.01)
C04B 35/58 (2006.01)

(52) U.S. Cl. ....................... 501/87; 501/96.3
(58) Field of Classification Search .................. 501/87, 501/96.3
See application file for complete search history.

(56) References Cited

U.S. PATENT DOCUMENTS

| | | | |
|---|---|---|---|
| 4,670,408 A | 6/1987 | Petzow et al. | |
| 4,904,623 A | 2/1990 | Petzow et al. | |
| 5,032,242 A | 7/1991 | Knudsen et al. | |
| 5,081,077 A | 1/1992 | Tani et al. | |
| 5,108,962 A | 4/1992 | Khazai et al. | |
| 5,342,811 A | 8/1994 | Khazai et al. | |
| 5,418,196 A | 5/1995 | Niihara | |
| 5,505,899 A | 4/1996 | Sigl et al. | |
| 5,543,370 A | 8/1996 | Sigl et al. | |
| 5,637,269 A | 6/1997 | Niihara | |
| 5,720,910 A | 2/1998 | Vlajic et al. | |

FOREIGN PATENT DOCUMENTS

| | | |
|---|---|---|
| JP | 63-236763 | 10/1988 |
| JP | 1-308874 | 12/1989 |
| JP | 2001-247366 | 9/2001 |

OTHER PUBLICATIONS

Derwent Abstract of Japanese document 2001247366. Sep. 11, 2001.
Abstract of Japanese document 401308874, Dec. 13, 1989.
Derwent Abstract of Japanese document 63236763, Oct. 3, 1988.
V. Skorokhod, Jr., et al., "High strength-high toughness $B_4C$-$TiB_2$ composites", Journal of Materials Science Letters, XP 001036449A, vol. 19, No. 3, 2000, pp. 237-239.
Gen Sasaki, et al., "Microstructure of $B_4C$/$TiB_2$ Composite Fabricated by Reaction Sintering of $B_4C$ and TiC", Journal of the Ceramic Society of Japan, International Edition, XP 000541796, vol. 102, No. 4, Apr. 1994, 4 pages.
Suzuya Yamada, et al., "Microstructure and Mechanical Properties of $B_4C$-$C_rB_2$ Ceramics", Key Engineering Materials, XP 009079304, vol. 206-213, Feb. 15, 2002, pp. 811-814.
Suzuya Yamada, et al., "Mechanical Properties of Boron Carbide Ceramics", Ceramic Engineering and Science, XP 009079326, 2001, pp. 215-220.
N. Frage, et al., "The Effect of $Cr_2O_3$ and $CrB_2$ Additions on the Pressureless Sintering of $B_4C$ Preforms", Science of Sintering, XP 009079303, vol. 33, No. 3, 2001, pp. 149-158.

*Primary Examiner*—Karl E Group
(74) *Attorney, Agent, or Firm*—Oblon, Spivak, McClelland, Maier & Neustadt, P.C.

(57) ABSTRACT

A boron carbide based sintered body having a four-point flexural strength of at least 400 MPa and a fracture toughness of at least 2.8 MPa·m$^{1/2}$, which has the following two preferred embodiments. (1) A boron carbide-titanium diboride sintered body obtained by sintering a mixed powder of a $B_4C$ powder, a $TiO_2$ powder and a C powder while reacting them under a pressurized condition and comprising from 95 to 70 mol % of boron carbide and from 5 to 30 mol % of titanium diboride, wherein the boron carbide has a maximum particle diameter of at most 5 μm. (2) A boron carbide-chromium diboride sintered body containing from 10 to 25 mol % of $CrB_2$ in $B_4C$, wherein the sintered body has a relative density of at least 90%, boron carbide particles in the sintered body have a maximum particle diameter of at most 100 μm, and the abundance ratio (area ratio) of boron carbide particles of from 10 to 100 μm to boron carbide particles having a particle diameter of at most 5 μm, is from 0.02 to 0.6.

1 Claim, No Drawings

BORON CARBIDE BASED SINTERED COMPACT AND METHOD FOR PREPARATION THEREOF

This application is a divisional of U.S. application Ser. No. 11/618,020, filed Dec. 29, 2006, which is a continuation of U.S. application Ser. No. 11/477,433, filed Jun. 30, 2006, now abandoned, which is a continuation of U.S. application Ser. No. 10/493,222, filed Oct. 20, 2004, now abandoned, which is a national phase application of PCT/JP02/11577, filed Nov. 6, 2002.

TECHNICAL FIELD

The present invention relates to a boron carbide based sintered body, such as a boron carbide-titanium diboride sintered body or a boron carbide-chromium diboride sintered body, having high density, four-point flexural strength and fracture toughness, and a process for its production.

BACKGROUND ART

In general, a boron carbide sintered body is expected to have a wide range of applications as a material having a light weight and high hardness and being excellent in abrasion resistance or corrosion resistance. At present, it is used, for example, for a sandblast nozzle, a wire drawing die or an extrusion die. However, on the other hand, such a boron carbide sintered body has a drawback that it has low strength. For example, K. A. Schwetz, J. Solid State Chemistry, 133, 177-81 (1997) discloses preparation of boron carbide sintered bodies by HIP treatment under various sintering conditions, but a boron carbide sintered body having a flexural strength of at least 600 MPa has not yet been obtained.

Further, V. Skorokhod, J. Material Science Letter, 19, 237-239 (2000) discloses that a mixture comprising a boron carbide ($B_4C$) powder, a titanium dioxide ($TiO_2$) powder and a carbon (C) powder, is sintered under a pressurized condition employing a hot press method while reacting a part of boron carbide with titanium dioxide and carbon (see the following reaction formula), to obtain a boron carbide-titanium diboride sintered body, whereby a four-point flexural strength of 621 MPa is obtained.

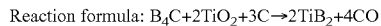
Reaction formula: $B_4C + 2TiO_2 + 3C \rightarrow 2TiB_2 + 4CO$

However, in order to make it practically possible to use a boron carbide based sintered body in a wide range of applications, it is desired to develop a boron carbide based sintered body having a still higher four-point flexural strength. However, as mentioned above, according to the conventional methods, a boron carbide based sintered body having a high four-point flexural strength exceeding 621 MPa has not yet been obtained.

Further, a boron carbide based sintered body is hardly sinterable and accordingly, it is usually prepared by a hot press method. This production method hinders a common application of a boron carbide based sintered body, since its production cost is high. Accordingly, it is being studied to prepare a boron carbide sintered body by heating (sintering) under a non-pressurized condition (a normal pressure method) instead of the hot press method. For example, in the above-mentioned prior art reference K. A. Schwetz, J. Solid State Chemistry, 133, 177-81 (1997), carbon is added as a sintering-assisting agent, and a boron carbide sintered body is prepared under a non-pressurized condition. However, such a method is not practically preferred, since it is necessary to carry out sintering at an extremely high temperature of at least 2150° C.

Further, a boron carbide sintered body has an extremely high hardness, whereby it can hardly be processed by a usual grinding/polishing method, and further, the electric conductivity of the boron carbide sintered body is low at a level of from 10 to 300 S/m, whereby there has been a problem that the discharge processing is difficult.

As mentioned above, a boron carbide sintered body is hardly sinterable and hardly processable, and at present, it is practically used only in an extremely limited application.

Under these circumstances, the present inventors have conducted an extensive research with an aim to develop a new boron carbide based sintered body which has a four-point flexural strength higher than the above-mentioned four-point flexural strength of 621 MPa and which makes it possible to realize a wide range of applications, and as a result, have found it possible to accomplish the desired object by selecting a specific material and by carrying out sintering treatment with a specific composition and under a specific temperature condition.

Further, the present inventors have found it possible to obtain a boron carbide based sintered body having excellent characteristics by preparing a sintered body having a specific microstructure wherein a highly electrically conductive chromium diboride phase forms a three dimensional network structure, by adding a predetermined amount of chromium diboride to a boron carbide powder having a specific physical property and carrying out liquid phase sintering under a non-pressurized condition to form a liquid phase of chromium diboride.

The present invention has been accomplished on the basis of the above discoveries.

Namely, it is an object of the present invention to provide a novel boron carbide based sintered body having a four-point flexural strength of at least 400 MPa and a fracture toughness of at least $2.8$ MPa·m$^{1/2}$.

Further, it is an object of the present invention to provide a boron carbide-titanium diboride sintered body having a four-point flexural strength of at least 700 MPa, preferably at least 800 MPa and a fracture toughness of at least $3.0$ MPa·m$^{1/2}$.

Further, it is an object of the present invention to provide a novel process for producing a boron carbide material which makes it possible to produce a boron carbide based sintered body which has a high density and having the fracture toughness improved, wherein the maximum particle diameter of boron carbide is at most 5 μm, the titanium diboride particles are uniformly dispersed in the boron carbide matrix, and the agglomerated/dispersed state of titanium diboride particles is uniform and good.

Further, it is an object of the present invention to provide a boron carbide based sintered body which has a relative density of at least 90%, an electrical conductivity of at least $5 \times 10^2$ S/m, a four-point flexural strength of at least 400 MPa and a fracture toughness of at least $3.0$ MPa·m$^{1/2}$, and a process for producing it by sintering under a non-pressurized condition.

DISCLOSURE OF THE INVENTION

The gist of the present invention to solve the above problems, is as follows.

(1) A boron carbide based sintered body characterized by having a four point flexural strength of at least 400 MPa as measured in accordance with JIS R1601 and a fracture toughness of at least $2.8$ MPa·m$^{1/2}$ as measured in accordance with JIS R1607-SEPB method.

(2) The boron carbide based sintered body according to the above (1), which is a boron carbide-titanium diboride sintered body obtained by sintering a mixed powder of boron carbide (B₄C) powder, titanium dioxide (TiO₂) powder and carbon (C) powder while reacting them under a pressurized condition and which comprises from 95 to 70 mol % of boron carbide and from 5 to 30 mol % of titanium diboride, wherein the boron carbide has a maximum particle diameter of at most 5 μm.

(3) The boron carbide based sintered body according to the above (1) or (2), wherein the four point flexural strength is at least 700 MPa.

(4) The boron carbide based sintered body according to the above (1), (2) or (3), wherein the four point flexural strength is at least 800 MPa, and the fracture toughness is at least 3.0 MPa·m$^{1/2}$.

(5) A boron carbide based sintered body which is a boron carbide-chromium diboride sintered body containing from 10 to 25 mol % of chromium diboride (CrB₂) in boron carbide (B₄C), characterized in that the sintered body has a relative density of at least 90%, boron carbide particles in the sintered body have a maximum particle diameter of at most 100 μm, and the abundance ratio (area ratio) of boron carbide particles of from 10 to 100 μm to boron carbide particles having a particle diameter of at most 5 μm, is from 0.02 to 0.6.

(6) The boron carbide based sintered body according to the above (5), which has an electric conductivity of at least 5×10 S/m.

(7) The boron carbide based sintered body according to the above (6), which has a four point flexural strength of at least 400 MPa and a fracture toughness of at least 3.0 MPa·m$^{1/2}$.

(8) A process for producing a boron carbide based sintered body, characterized by mixing a titanium dioxide powder having an average particle diameter of less than 1 μm and a carbon powder having an average particle diameter of less than 1 μm to a boron carbide powder having a maximum particle diameter of at most 5 μm, an average particle diameter of at most 1 μm and a specific surface area of at least 10 m²/g, and sintering the mixture within a temperature range of from 1900 to 2100° C. while reacting them under a pressurized condition.

(9) The process for producing a boron carbide based sintered body according to the above (8), wherein the specific surface area of the boron carbide powder is at least 16 m²/g, and the average particle diameter of each of the titanium dioxide powder and the carbon powder is less than 0.1 μm.

(10) A process for producing a boron carbide based sintered body, characterized by molding a raw material powder having from 10 to 25 mol % of a chromium diboride powder added and mixed to a boron carbide powder having an average particle diameter (D₅₀) of at most 2 μm and a specific surface area of at least 10 m²/g, followed by heating from 1950 to 2100° C. in a non-oxidizing atmosphere under a non-pressurized condition.

(11) A shock absorber made of the boron carbide based sintered body as defined in any one of the above (1) to (7).

(12) The shock absorber according to the above (11), wherein the shock absorber is for a high velocity missile.

(13) An abrasion resistant component made of the boron carbide based sintered body as defined in any one of the above (1) to (7).

BEST MODE FOR CARRYING OUT THE INVENTION

Now, the present invention will be described in further detail.

The present invention is a boron carbide based sintered body having a four-point flexural strength of at least 400 MPa as measured in accordance with JIS R1601 and a fracture toughness of at least 2.8 MPa·m$^{1/2}$, preferably at least 3.0 MPa·m$^{1/2}$, as measured in accordance with JIS R1607-SEPB method, which is a novel boron carbide based sintered body. Such a boron carbide based sintered body having a high four-point flexural strength and a high fracture toughness is useful in a wide range of applications for e.g. sliding components, cutting tools, bulletproof plates or novel abrasion resistant components by virtue of its properties and thus is industrially useful.

A boron carbide based sintered body according to a preferred embodiment of the present invention is a boron carbide-titanium diboride sintered body obtained by mixing a boron carbide powder having a specific property with a titanium dioxide powder and a carbon powder in a specific composition and sintering them in a specific temperature range under a pressurized condition while reacting a part of the boron carbide powder with the titanium dioxide powder and the carbon powder in accordance with the following reaction formula.

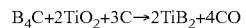

$$B_4C + 2TiO_2 + 3C \rightarrow 2TiB_2 + 4CO$$

The present inventors have conducted various experimental studies on a process for sintering boron carbide while utilizing the above reaction and as a result, have found that when specific materials are selected for use and sintering treatment is carried out with a specific composition and under a specific temperature condition, it is possible to obtain a boron carbide-titanium diboride sintered body which has a high density and a specific microstructure, wherein the maximum particle diameter of boron carbide is at most 5 μm, titanium diboride particles are uniformly dispersed in the boron carbide matrix, and the agglomerated/dispersed state of titanium diboride particles is uniform and good and that the sintered body has a four-point flexural strength of at least 700 MPa which has not been obtained heretofore, and has high strength characteristics.

The boron carbide-titanium diboride sintered body is a boron carbide-titanium diboride sintered body obtained by sintering a mixed powder comprising a boron carbide (B₄C) powder, a titanium dioxide (TiO₂) powder and a carbon (C) powder while reacting them in a specific temperature range under a pressurized condition, and it comprises from 95 to 70 mol % of boron carbide and from 5 to 30 mol % of titanium diboride and yet, the maximum particle diameter of the boron carbide is at most 5 μm.

The reason for specifying the compositional ratio of boron carbide and titanium diboride in the above range, is that if titanium diboride present in the boron carbide-titanium diboride sintered body is less than 5 mol %, no adequate effect for improving the strength can be obtained, and if it exceeds 30 mol %, the density of the sintered body tends to be higher than 3.0 g/cm³, whereby the light weight feature of the boron carbide based sintered body will be lost, and at the same time, the hardness will be low.

Further, even in the range of the above compositional ratio, if the maximum particle diameter of boron carbide in the sintered body exceeds 5 μm, it will be difficult to obtain one having a high strength. When the above-mentioned specific compositional range and the specific microstructure are satisfied at the same time, it will be possible for the first time to obtain a boron carbide-titanium diboride sintered body having a sufficiently high strength.

The sintered body of the present invention shows a high strength with a four-point flexural strength of at least 700 MPa when the above conditions are satisfied. Further, according to a result of the studies made by the present inventors, by selecting preferred conditions with respect to the particle sizes of the boron carbide powder, the titanium dioxide powder and the carbon powder to be used as the starting materials, such as selecting those having finer particle sizes, it becomes possible to obtain a boron carbide-titanium diboride sintered body which has a four-point flexural strength of at least 800 MPa and yet has a high strength characteristic with a fracture toughness of at least 3.0 MPa·m$^{1/2}$.

The boron carbide-titanium diboride sintered body of the present invention is effective for prolonging the useful life when it is applied to a conventional sandblast, a wire drawing die, an extrusion die, etc., and has a remarkable characteristic which can not be expected with a conventional boron carbide based sintered body, such that it can be suitably applied to a wide range of applications which has heretofore been impossible.

In the process for producing a boron carbide-titanium diboride sintered body of the present invention, a boron carbide powder, a titanium dioxide powder and a carbon powder having specific properties are used as the starting materials, and they are mixed and sintered while reacting them in a specific temperature range under a pressurized condition of e.g. a hot pressing method. It is thereby possible to obtain a boron carbide-titanium diboride sintered body having the above-mentioned characteristics, which has a high density and wherein the maximum particle size of boron carbide is at most 5 µm, titanium diboride particles are uniformly dispersed in the boron carbide matrix, the agglomerated/dispersed state of titanium diboride particles is uniform and good, and the fracture toughness is improved, by controlling the particle sizes, the maximum particle sizes, the agglomerated states, and the dispersed state, of boron carbide particles and titanium diboride particles in the boron carbide-titanium diboride sintered body.

The boron carbide powder to be used in the present invention is one having an average particle diameter (D50) is at most 1 µm and a maximum particle diameter of at most 5 µm, as measured by a laser diffraction scattering analyzer (Microtrac). If the average particle diameter (D50) is larger than 1 µm, the sinterability tends to be poor, and it becomes impossible to obtain a dense sintered body within a temperature range of from 1900 to 2100° C., and in order to densify such a material, it will be required to adopt a higher sintering temperature so that grain growth is likely to take place consequently, the maximum diameter of the boron carbide particles in the obtainable sintered body tends to exceed 5 µm, whereby it tends to be difficult to obtain a sintered body having a high four-point flexural strength. Further, with respect to the specific surface area (BET) of the boron carbide powder, a boron carbide powder having a specific surface area of at least 10 m$^2$/g is preferably selected for use, since its sinterability is good.

With respect to the titanium dioxide powder and the carbon powder to be used in the present invention, it is necessary to use fine powders in order to carry out a uniform reaction during sintering, and they are ones having an average particle diameter (D50) of less than 1 µm as measured by a laser diffraction scattering analyzer (Microtrac). If the average particle diameter (D50) is at least 1 µm, large titanium diboride particles will be formed in the sintered body, and such large particles will be starting points for fracture, whereby it becomes impossible to obtain a sintered body having a high four-point flexural strength.

Further, in a case where the average particle diameter is less than 0.1 µm, it tends to be difficult to carry out the measurement accurately, since the powder tends to agglomerate during the measurement by a laser diffraction scattering analyzer. Therefore, a BET average particle diameter calculated from the specific surface area may be employed. Further, titanium dioxide has crystal systems of rutile type, anatase type and brookite type, and any type may be employed.

The boron carbide powder, the titanium dioxide powder and the carbon powder having the above-mentioned physical properties may respectively be obtained by such a means as sieving, separation by sedimentation, pulverization, etc. Commercial products may be used so long as they have the above-mentioned physical properties.

In the present invention, a titanium dioxide powder having an average particle diameter of less than 1 µm and a carbon powder having an average particle diameter of less than 1 µm are blended to a boron carbide powder having an average particle diameter of at most 1 µm, a maximum particle diameter of at most 5 µm and a specific surface area of at least 10 m$^2$/g, preferably in a blend ratio of from 4.5 to 19 mol % of the titanium dioxide powder, and the molar ratio of carbon powder/titanium dioxide powder being from 1.4 to 1.7, followed by mixing, so that the composition of the boron carbide-titanium diboride sintered body to be prepared would be from 95 to 70 mol % of boron carbide and from 5 to 30 mol % of titanium diboride. Then, if necessary, this mixture is molded and then the above mixed powder or molded product is sintered in a temperature range of from 1900 to 2100° C. in vacuum or in an inert gas atmosphere of e.g. Ar while reacting them under a pressurized condition to let titanium diboride particles form among boron carbide particles, to prepare a dense boron carbide-titanium diboride sintered body having a relative density of at least 98%.

Here, in the method for obtaining the boron carbide-titanium diboride sintered body by sintering the mixed powder comprising the boron carbide powder, the titanium dioxide powder and the carbon powder, in the specific temperature range while reacting them under a pressurized condition, according to the study by the present inventors, there is a technical problem that titanium diboride particles in the prepared boron carbide-titanium diboride sintered body, tend to agglomerate in the reaction process and are likely to form large agglomerated masses, and if titanium diboride agglomerated masses or coarse boron carbide particles larger than 5 µm, are present, they serve as fracture starting points and bring about deterioration of the four-point bending strength.

According to the present invention, a boron carbide powder having a specific physical property is used, whereby sinterability of the boron carbide powder itself is good, and as compared with formation of titanium diboride particles, sintering among the boron carbide particles will preferentially proceed, whereby titanium diboride particles will be uniformly dispersed in the boron carbide matrix, whereby the agglomerated/dispersed state of titanium diboride particles will be uniform and good. As a result, it is possible to make that there will be no substantial presence of coagulated particles of titanium diboride. Further, the maximum particle diameter of boron carbide is at most 5 µm, and accordingly, coarse boron carbide particles are not present from the beginning. As a result, the obtainable boron carbide-titanium diboride sintered body has a four point flexural strength as high as at least 700 MPa, as mentioned above.

In addition, according to the present invention, when a boron carbide powder having an average particle size of at most 1 µm, a maximum particle size of at most 5 µm and a specific surface area of at least 16 m$^2$/g is used, and a titanium dioxide powder having an average particle size of less than 0.1 µm and a carbon powder having an average particle size of less than 0.1 µm are employed, the agglomerated/dispersed state of titanium diboride particles becomes more uniform and good. And, even if particles of the titanium dioxide powder are joined during the process wherein sintering of the boron carbide powder proceeds for a grain growth to from 2 to 3 μm, titanium diboride particles of from 2 to 3 μm will form, and the titanium diboride particles will be uniformly dispersed without being coagulated at all. As a result, boron carbide-titanium diboride sintered body can be obtained, which has a specific microstructure having titanium diboride uniformly dispersed and which has high strength.

Namely, in a boron carbide-titanium diboride sintered body, the thermal expansion coefficient of titanium diboride is larger than boron carbide. Accordingly, in a case where titanium diboride particles having a size of from 2 to 3 μm are present in the boron carbide matrix, crack propagation detour or microcracking takes place in the vicinity of the interface between the boron carbide matrix and the titanium diboride particles during the progress of fracture, whereby the fracture toughness will be improved. And, in the process for producing a boron carbide-titanium diboride sintered body, the agglomerated/dispersed state of titanium diboride particles will be good, and the fracture toughness will be improved. Its strength will further be improved, and it is possible to prepare a boron carbide-titanium diboride sintered body having a high flexural strength of at least 800 MPa and having a fracture toughness of at least 3.0 MPa·m$^{1/2}$.

In the present invention, the titanium dioxide powder having an average particle size of less than 0.1 μm, may be any one so long as the above-mentioned requirements are satisfied. However, a spherical powder prepared by a vapor phase method will suitably be employed. Further, as the carbon powder, any one may be used so long as the average particle diameter is less than 0.1 μm, and carbon black or acetylene black can be preferably employed.

In the present invention, with respect to the sintering conditions, if the sintering temperature is lower than 1900° C., it will be difficult to prepare a sufficiently dense boron carbide-titanium diboride sintered body. On the other hand, if the sintering temperature is higher than 2100° C., a fine sintered structure can not be obtained due to an abnormal grain growth, whereby the flexural strength is likely to be low. Accordingly, it is preferred to select the temperature within a range of from 1900 to 2100° C.

Further, the pressure during the sintering is usually from 20 MPa to 100 MPa, preferably from 30 MPa to 60 MPa. However, in a case where the pressure during the sintering is lower than 20 MPa, no adequately dense sintered body can be obtained. Further, in a case where the pressure exceeds 100 MPa, discharge of a carbon monoxide gas to the exterior will be prevented, whereby formation of titanium diborate is likely to be impaired.

Another preferred boron carbide based sintered body of the present invention is a boron carbide-chromium diboride sintered body containing from 10 to 25 mol % of chromium diboride ($CrB_2$) in boron carbide ($B_4C$), characterized in that the sintered body has a relative density of at least 90%, boron carbide particles in the sintered body have a maximum particle diameter of at most 100 μm, and the abundance ratio (area ratio) of boron carbide particles of from 10 to 100 μm to boron carbide particles having a particle diameter of at most 5 μm, is from 0.02 to 0.6.

In order to prepare a dense boron carbide based sintered body by sintering under a non-pressurized condition, grain growth of boron carbide to some extent is required, and if no grain growth takes place, a sintered body having a high density can not be obtained. On the other hand, if grain growth proceeds too much, coarse grains will hinder densification, whereby the density of the sintered body tends to rather decrease, and coarse particles will be starting points for fracture, whereby the flexural strength tends to decrease.

In the present invention, by using a boron carbide powder having specific physical properties, sintering is carried out under a specific non-pressurized condition in a temperature range where a liquid phase containing chromium diboride ($CrB_2$) as the main component will form, whereby it is possible to obtain a boron carbide-chromium diboride sintered body characterized in that the maximum particle diameter of boron carbide particles is at most 100 μm, the abundance ratio (area ratio) of boron carbide particles of from 10 to 100 μm to boron carbide particles having a particle diameter of at most 5 μm, is within a range of from 0.02 to 0.6, the relative density is at least 90%, a highly electrically conductive chromium diboride phase forms a network structure three dimensionally, and the body has an electrical conductivity of at least $5 \times 10^2$ S/m, a four-point flexural strength of at least 400 MPa and a fracture toughness of at least 3.0 MPa·m$^{1/2}$.

The boron carbide powder to be used in the present invention may preferably one having an average particle diameter ($D_{50}$) of at most 2 μm as measured by a laser diffraction scattering method or a Doppler method. If the average particle diameter ($D_{50}$) is larger than 2 μm, the sinterability tends to be poor, a dense sintered body can hardly be obtainable within a temperature range of from 1950 to 2100° C., and in order to densify it, it will be required to sinter it at a higher temperature at which grain growth is more likely to take place, whereby deterioration of the flexural strength is likely to be brought about. With respect to the specific surface area (BET), it is preferred to employ a boron carbide powder having a specific surface area of at least 10 m$^2$/g, more preferably at least 15 m$^2$/g, which has good sinterability.

The boron carbide powder having the above physical properties can be prepared by a means such as sieving, separation by sedimentation, pulverization, etc., but a commercial product having such physical properties may be available for use.

To the boron carbide powder having the above physical properties, from 10 to 25 mol % of a chromium diboride powder is added and molded, followed by heating (sintering) in vacuum or under a non-pressurized condition under a non-oxidizing atmosphere such as Ar within a sintering temperature range of from 1950 to 2100° C. in a state where a chromium diboride based liquid phase is formed.

The chromium diboride powder will react and melt with a part of the boron carbide powder during the sintering to form a chromium diboride based liquid phase, which will penetrate among boron carbide particles, and as compared with the boron carbide powder, it may be used even in the form of a starting material powder having a large particle size. Preferably, a chromium diboride powder having an average particle size ($D_{50}$) of at most 8 μm may be used, and more preferably, one having an average particle diameter ($D_{50}$) of at most 4 μm may be used.

In a case where the sintering temperature is lower than 1950° C., a chromium diboride based liquid phase will not be formed, whereby a sufficiently dense boron carbide sintered body can not be prepared, and a three dimensional network structure of the chromium diboride phase can not be formed, whereby high electrical conductivity can not be obtained. On the other hand, at a sintering temperature higher than 2100° C., coarse boron carbide particles will be formed by grain growth, thus leading to deterioration of the flexural strength.

If the amount of chromium diboride is less than 10 mol %, a sufficient amount of the chromium diboride based liquid phase will not be formed, whereby a dense sintered body can hardly be obtained, and the effects for improving the electrical conductivity and the fracture toughness tend to be inadequate. On the other hand, if the amount of chromium diboride exceeds 25 mol %, the density of the sintered body will be higher than 3.0 g/cm$^3$, whereby the feature of light weight of the boron carbide type sintered body will be impaired, and the hardness will also be low.

The boron carbide-chromium diboride sintered body of the present invention has excellent properties and is useful as an abrasion resistant component. In the present invention, the abrasion resistant component means to include every type of a component such as a sliding component, a cutting tool, an abrasion resistant part, etc.

Effects

The effect mechanism with the boron carbide-titanium diboride sintered body as a preferred embodiment of the present invention, is as follows. Usually, in a process for producing a boron carbide-titanium diboride sintered body by sintering a mixed powder comprising a boron carbide powder, a titanium dioxide powder and a carbon powder while reacting them under a pressurized condition, titanium diboride particles are likely to agglomerate to form large agglomerated blocks in the reaction process, and if titanium diboride agglomerated blocks or coarse boron carbide particles larger than 5 μm, are present, they are likely to act as starting points for fracture and bring about deterioration of the four-point flexural strength.

However, in the present invention, the boron carbide-titanium diboride sintered body is prepared by using raw material powders having prescribed properties in a prescribed blend ratio to obtain a prescribed compositional ratio, whereby titanium diboride particles will be uniformly dispersed in the boron carbide matrix, and their agglomerated/dispersed state is uniform and good, and as a result, a boron carbide-titanium diboride sintered body having high strength and a specific microstructure wherein titanium diboride particles are uniformly dispersed in the boron carbide matrix, can be obtained.

Further, in the present invention, when a boron carbide powder having an average particle diameter of at most 1 μm, a maximum particle diameter of at most 5 μm and a specific surface area of at least 16 m$^2$/g, is used, and a titanium dioxide powder having an average particle diameter of less than 0.1 μm and a carbon powder having an average particle diameter of less than 0.1 μm are used, the agglomerated/dispersed state of titanium diboride particles will be more uniform and good, and consequently, a boron carbide-titanium diboride sintered body having a high strength can be obtained which has a microstructure wherein titanium diboride is uniformly dispersed and which has its strength further improved.

The effect mechanism with the boron carbide-chromium diboride sintered body as another preferred embodiment of the present invention, is as follows. By carrying out liquid phase sintering under a non-pressurized condition to form a liquid phase of chromium diboride, to prepare a sintered body having a specific microstructure wherein a highly electrically conductive chromium diboride phase forms a network structure three dimensionally, it is possible to prepare a boron carbide-chromium diboride sintered body having excellent characteristics.

With the boron carbide-chromium diboride sintered body of the present invention, since the thermal expansion coefficient of chromium diboride is larger than boron carbide, cracking propagation detour or microcracking takes place in the vicinity of the interface between the boron carbide particles and the chromium diboride phase during the progress of the fracture, whereby the fracture toughness will be improved. Further, the maximum particle size is at most 100 μm, protruded portions of boron carbide particles will be diminished by the dissolution/precipitation mechanism of the chromium diboride based liquid phase, whereby the stress concentration will be relaxed, and boron carbide particles will be bonded by the chromium diboride phase, whereby falling off of boron carbide particles during processing will be suppressed, and the fracture toughness will be improved, whereby the strength will be improved, and a high flexural strength of at least 400 MPa can be obtained.

Now, the present invention will be described in further detail with reference to Examples and Comparative Examples. However, it should be understood that the present invention is by no means restricted by the following Examples, etc. The four-point flexural strength and the fracture toughness of the boron carbide based sintered bodies were measured by JIS R1601 and JIS R1607, respectively.

EXAMPLES 1 to 40

As boron carbide powders, specific boron carbide powders A, B and C having the physical properties as identified in Table 1, were employed. As a submicron-size titanium dioxide powder, one having an average particle diameter (D50 as measured by a laser diffraction scattering analyzer) of 0.3 μm and a crystal phase of rutile type, was used. Further, as a nano-size titanium dioxide powder, a spherical powder prepared by a gas phase method and having a specific surface area (BET) of 48.5 m$^2$/g, an average particle diameter (BET method) of 31 nm and a crystal phase of 80% anatase and 20% rutile, was used. As a carbon powder, carbon black having a specific surface area (BET) of 88.1 m$^2$/g and an average particle diameter (BET method) of 30 nm, was used.

TABLE 1

Physical properties of boron carbide powders

| $B_4C$ starting material powder | Average particle diameter μm | Maximum particle diameter μm | BET m$^2$/g |
|---|---|---|---|
| A | 0.50 | 2.4 | 21.5 |
| B | 0.44 | 3.3 | 15.5 |
| C | 0.41 | 2.3 | 22.5 |
| D | 0.55 | 5.7 | 18.7 |
| E | 1.20 | 5.9 | 8.6 |

To the boron carbide powder, 14.5 mol % of the submicron-size or nano-size titanium dioxide powder and 21.5 mol % of carbon black were incorporated, and using a methanol solvent, mixing was carried out by a planetary ball mill made of silicon carbide (SiC) at a rotational speed of 270 rpm for 1 hour, followed by drying by a evaporator and further by drying at 150° C. for 24 hours. Then, the mixture was sieved through a sieve with an opening of 250 μm to obtain a boron carbide-titanium dioxide-carbon mixed powder.

Then, in a die made of graphite, the boron carbide-titanium dioxide-carbon mixed powder was filled and molded under 7.5 MPa and then placed in a firing furnace. In a pressurized state at 5 MPa, heating was carried out at a temperature raising rate of 40° C./min while vacuuming to a pressure of from $2.0 \times 10^{-1}$ to $2.0 \times 10^{-2}$ Pa by means of a diffusion pump. When the temperature reached 1000° C., vacuuming was terminated, and Ar gas was introduced at a flow rate of 2 liters/min to an atmosphere with a gas pressure of 0.103 MPa, followed by heating to 1500° C. From 1500° C. to 2000° C., the temperature was raised at a rate of 10° C./min. After the temperature reached 2000° C., the pressure was raised to 50

MPa and maintained for 1 hour to obtain a boron carbide-20 mol % titanium diboride sintered body.

The surface of a test piece was finished by a surface grinding machine No. 400. Further, the density of the test piece was measured by an Archimedes method, and the relative density was calculated. The surface of the test piece was subjected to lapping and etching treatment, whereupon SEM observation was carried out to obtain the maximum particle diameter of boron carbide. Further, by the X-ray diffraction method, identification of the crystal phase in the sintered body was carried out. The results of such measurements are shown in Table 2.

TABLE 2

Examples and Comparative Examples

| No. | $B_4C$ starting material powder | $TiO_2$ starting material powder | Density of sintered body g/cm³ | Relative density of sintered body % | Four-point flexural strength MPa | Fracture toughness MPa·m$^{1/2}$ | Maximum particle diameter of boron carbide μm |
|---|---|---|---|---|---|---|---|
| Example 1 | A | Submicron | 2.82 | 100 | 720 | 3.1 | 3.5 |
| Example 2 | B | Nano size | 2.82 | 100 | 720 | 2.8 | 3.4 |
| Example 3 | A | Nano size | 2.82 | 100 | 870 | 3.4 | 3.8 |
| Example 4 | C | Nano size | 2.82 | 100 | 815 | 3.2 | 3.9 |
| Comparative 1 | E | Submicron | 2.75 | 97.8 | 475 | 2.8 | 6.4 |
| Comparative 2 | D | Nano size | 2.82 | 100 | 585 | 2.8 | 6.1 |

Each of the boron carbide-titanium diboride sintered bodies prepared in Examples 1 to 4 had a high density and a maximum particle diameter of boron carbide of at most 5 μm and a high four-point flexural strength of at least 700 MPa. Especially, in Examples 3 and 4, a four-point flexural strength of at least 800 MPa and a high fracture toughness of at least 3 MPa·m$^{1/2}$ were obtained. Further, in each sintered body, a crystal phase was detected with respect to boron carbide and titanium diboride, and unreacted titanium dioxide was not detected.

COMPARATIVE EXAMPLES 1 and 2

Then, as Comparative Examples, boron carbide-20 mol % titanium diboride sintered bodies were prepared in the same manner as in Examples 1 to 4 except that the composition was changed to a combination of the boron carbide powder E as identified in Table 1 and the submicron-size titanium dioxide powder as used in Examples 1 to 4, and a combination of the boron carbide powder D as identified in Table 1 and the nano-size titanium dioxide powder.

Further, in the same manner as in Examples 1 to 4, evaluation of the four-point flexural strength, the fracture toughness, the density of the sintered body and the maximum particle diameter of boron carbide, was carried out. The results of measurements thereof are shown in Table 2. The four-point flexural strength of the sintered body in each of Comparative Examples 1 and 2, was low at a level of not more than 600 MPa, and the maximum particle diameter of boron carbide was larger than 5 μm.

EXAMPLE 5

To a boron carbide powder I having the physical properties as identified in Table 3, 20 mol % of a chromium diboride powder having an average particle diameter ($D_{50}$) of 3.5 μm was blended, and using a methanol solvent, the blend was mixed by a planetary ball mill made of SiC at a rotational speed of 275 rpm for 1 hour. The slurry was dried by an evaporator and further dried at 150° C. for 24 hours, and then it was sieved through a sieve of 250 mesh to obtain a boron carbide-chromium diboride mixed powder.

This powder was molded in a mold under 20 MPa, followed by CIP molding under 200 MPa to obtain a molded product. The molded product was put into a graphite container and placed in a resistance heating type firing furnace. Heating was carried out at a temperature-raising rate of 40° C./min while vacuuming to a pressure of from $2.0 \times 10^{-1}$ to $2.0 \times 10^{-2}$ Pa by means of a diffusion pump. When the temperature reached 1000° C., vacuuming was terminated, and Ar gas was introduced, followed by heating to 1500° C. From 1500° C. to 2030° C., heating was carried out at a temperature raising rate of 10° C./min. After the temperature reached 2030° C., sintering was carried out for 1 hour under a non-pressurized condition to obtain a boron carbide-chromium diboride sintered body.

TABLE 3

Physical properties of $B_4C$ starting material powders

| $B_4C$ starting material powder | Average particle diameter μm | BET m²/g |
|---|---|---|
| I | 0.43 | 15.3 |
| II | 1.60 | 17.5 |
| III | 2.90 | 8.6 |

The surface of a test piece was finished by a surface grinding machine No. 400. Further, the density of the test piece was measured by an Archimedes method, and the relative density was calculated. The surface of the test piece was subjected to lapping and etching treatment, whereupon SEM observation was carried out, and image treatment was carried out to measure the maximum particle diameter of boron carbide and the abundance ratio (area ratio) of boron carbide particles of from 10 to 100 μm to boron carbide particles having a particle diameter of at most 5 μm. The electrical conductivity was measured by means of a four terminal method.

The results of evaluation are shown in Table 4. The sintered body had a relative density of at least 90%, a maximum particle diameter of at most 100 μm, an abundance ratio (area ratio) of the boron carbide particles being within a range of from 0.02 to 0.6, and had an electrical conductivity of at least $5 \times 10^2$ S/m, a four-point flexural strength of at least 400 MPa and a fracture toughness of at least 3.0 MPa·m$^{1/2}$.

TABLE 4

Examples and Comparative Examples

| No. | CrB$_2$ amount mol % | B$_4$C starting material powder | Sintering temp. °C. | Density of sintered body g/cm$^3$ | Relative density of sintered body % | Abundance ratio of B$_4$C particles % | Maximum particle diameter μm | Flexural strength MPa | Fracture toughness MPa·m$^{1/2}$ | Electric conductivity S/m |
|---|---|---|---|---|---|---|---|---|---|---|
| Ex. 1 | 20 | I | 2030 | 2.86 | 98.1 | 0.09 | 32 | 528 | 3.7 | $2.1 \times 10^4$ |
| Ex. 2 | 20 | II | 2030 | 2.84 | 97.2 | 0.08 | 35 | 460 | 3.6 | $1.2 \times 10^4$ |
| Ex. 3 | 15 | I | 2050 | 2.75 | 97.6 | 0.40 | 75 | 457 | 3.1 | $7.3 \times 10^3$ |
| Ex. 4 | 22.5 | I | 2020 | 2.85 | 95.8 | 0.26 | 58 | 436 | 3.5 | $8.6 \times 10^3$ |
| Comp. Ex. 1 | 20 | III | 2030 | 2.57 | 87.9 | 0.01 | 32 | 320 | 2.4 | $5.5 \times 10^2$ |
| Comp. Ex. 2 | 7.5 | I | 2030 | 2.11 | 79.5 | 0.01 | 16 | 175 | 2.3 | $7.5 \times 10$ |

EXAMPLE 6

To a boron carbide powder II having the physical properties as identified in Table 3, 20 mol % of a chromium diboride powder having an average particle diameter (D$_{50}$) of 3.5 μm was blended, and using a methanol solvent, the blend was mixed by a planetary ball mill made of SiC at a rotational speed of 275 rpm for 1 hour. The slurry was dried by an evaporator and further dried at 150° C. for 24 hours, whereupon it was sieved through a sieve of 250 mesh to obtain a boron carbide-chromium diboride mixed powder.

This powder was molded in a mold under 20 MPa, followed by CIP molding under 200 MPa to obtain a molded product. The molded product was put into a graphite container and placed in a resistance heating type firing furnace. Heating was carried out at a temperature-raising rate of 40° C./min while vacuuming to a pressure of from $2.0 \times 10^{-1}$ to $2.0 \times 10^{-2}$ Pa by means of a diffusion pump. When the temperature reached 1000° C., vacuuming was terminated, and Ar gas was introduced, followed by heating to 1500° C. From 1500° C. to 2030° C., the temperature was raised at a rate of 10° C./min. After the temperature reached 2030° C., sintering was carried out for 1 hour under a non-pressurized condition to obtain a boron carbide-chromium diboride sintered body.

The surface of a test piece was finished by a surface grinding machine No. 400. Further, the density of the test piece was measured by an Archimedes method, and the relative density was calculated. The surface of the test piece was subjected to lapping and etching treatment, whereupon SEM observation was carried out and image treatment was carried out to measure the maximum particle diameter of boron carbide and the abundance ratio (area ratio) of boron carbide particles of from 10 to 100 μm to boron carbide particles having a particle diameter of at most 5 μm. The electric conductivity was measured by a four-terminal method.

The results of evaluation are shown in Table 4. The sintered body had a relative density of at least 90%, a maximum particle diameter of at most 100 μm, the abundance ratio (area ratio) of boron carbide particles being within a range of from 0.02 to 0.6, and had an electrical conductivity of at least $5 \times 10^2$ S/m, a four-point flexural strength of at least 400 MPa and a fracture toughness of at least 3.0 MPa·m$^{1/2}$.

COMPARATIVE EXAMPLE 3

Sintering was carried out under a non-pressurized condition in the same manner as Examples 5 and 6 except that a boron carbide powder III having the physical properties as identified in Table 3 was used, to obtain a boron carbide-chromium diboride sintered body, and evaluation was carried out.

In Table 4, the results of evaluation are shown. In Comparative Example 3, a boron carbide powder having an average particle diameter (D$_{50}$) larger than 2 μm and a specific surface area (BET) smaller than 10 m$^2$/g, was used whereby a dense sintered body was not obtained, and the abundance ratio (area ratio) of boron carbide particles was outside the range of from 0.02 to 0.6, whereby the flexural strength and the fracture toughness had low values.

EXAMPLE 7

To a boron carbide powder I, 15 mol % of the same chromium diboride powder as in Examples 5 and 6, was blended, and in the same manner as in Examples 5 and 6, a boron carbide-chromium diboride mixed powder was prepared. Sintering was carried out under a non-pressurized condition in the same manner as in Examples 5 and 6, except that the sintering temperature was changed to 2050° C., to obtain a boron carbide-chromium diboride sintered body, and evaluation was carried out.

The results of evaluation are shown in Table 4. The sintered body had a relative density of at least 90%, a maximum particle diameter of at most 100 μm, an abundance ratio (area ratio) of boron carbide particles being within a range of from 0.02 to 0.6, and had an electric conductivity of at least $5 \times 10^2$ S/m, a four-point flexural strength of at least 400 MPa and a fracture toughness of at least 3.0 MPa·m$^{1/2}$.

EXAMPLE 8

To a boron carbide powder I, 22.5 mol % of the same chromium diboride powder as in Examples 5 and 6, was blended, and in the same manner as in Examples 5 and 6, a boron carbide-chromium diboride mixed powder was prepared. Sintering was carried out under a non-pressurized condition in the same manner as in Examples 5 and 6 except that the sintering temperature was changed to 2020° C., and evaluation was carried out.

The results of evaluation are shown in Table 4. The sintered body had a relative density of at least 90%, a maximum particle diameter of at most 100 μm, an abundance ratio (area ratio) of boron carbide particles being within a range of from 0.02 to 1.6, and had an electric conductivity of at least $5 \times 10^2$ S/m, a four-point flexural strength of at least 400 MPa, and a fracture toughness of at least 3.0 MPa·m$^{1/2}$.

COMPARATIVE EXAMPLE 4

Sintering was carried out under a non-pressurized condition in the same manner as in Examples 5 and 6 except that the amount of the chromium diboride powder was changed to 7.5 mol %, to obtain a boron carbide-chromium diboride sintered body, and evaluation was carried out.

The results of evaluation are shown in Table 4. The amount of the chromium diboride powder was small, and no adequate amount of the chromium diboride based liquid phase was formed, whereby a dense sintered body was not obtained, and the abundance ratio (area ratio) of the boron carbide particles was not within the range of from 0.02 to 0.6, the electrical conductivity was not improved, and the flexural strength and the fracture toughness had low values.

INDUSTRIAL APPLICABILITY

According to the present invention, the following industrially useful effects can be obtained.
(1) It is possible to prepare a boron carbide-titanium diboride sintered body having a high four-point flexural strength of at least 700 MPa.
(2) It is possible to obtain a boron carbide-titanium diboride sintered body which has a high density and a maximum particle diameter of boron carbide of 5 μm, wherein titanium diboride particles are uniformly dispersed in the boron carbide matrix, the agglomerated/dispersed state of titanium diboride particles is uniform and good, and the fracture toughness is improved.
(3) The boron carbide-titanium diboride sintered body has a four-point flexural strength as high as at least 700 MPa which has not been obtained by a conventional method, and it is useful in a wide range of applications for e.g. sliding components, cutting tools, bullet-proof plates and new abrasion resistant components, and is thus industrially useful.
(4) It is possible to obtain a sintered body wherein a highly electrically conductive chromium diboride phase forms a network structure three dimensionally,
(5) The boron carbide-chromium diboride sintered body of the present invention can be prepared by heating (sintering) under a non-pressurized condition at a low sintering temperature.
(6) The sintered body has a high density and good electric conductivity and is processable by discharge processing.
(7) A novel abrasion resistant component can be provided.
(8) The boron carbide-chromium diboride sintered body has high strength and toughness and is excellent in mechanical properties, and thus, it is useful for various applications for e.g. sliding components, cutting tools and new abrasion resistant components and is thus industrially useful.

The invention claimed is:
1. A process for producing a boron carbide based sintered body, characterized by molding a raw material powder having from 10 to 25 mol % of a chromium diboride powder added and mixed to a boron carbide powder having an average particle diameter ($D_{50}$) of at most 2 μm and a specific surface area of at least 10 $m^2/g$, followed by heating from 1950 to 2100° C. in a non-oxidizing atmosphere under a non-pressurized condition.

* * * * *